(12) United States Patent
Kostromine et al.

(10) Patent No.: US 10,526,504 B2
(45) Date of Patent: Jan. 7, 2020

(54) METALLIZABLE, SCRATCH-RESISTANT AND SOLVENT-RESISTANT FILM

(71) Applicant: Covestro Deutschland AG, Leverkusen (DE)

(72) Inventors: Serguei Kostromine, Swisttal-Buschhoven (DE); Joachim Petzoldt, Monheim (DE); Roland Künzel, Leverkusen (DE); Konstantin Leonhardt, Grevenbroich (DE)

( * ) Notice: Subject to any disclaimer, the term of this patent is extended or adjusted under 35 U.S.C. 154(b) by 0 days.

(21) Appl. No.: 15/898,297

(22) Filed: Feb. 16, 2018

(65) Prior Publication Data

US 2018/0187041 A1 Jul. 5, 2018

Related U.S. Application Data

(63) Continuation of application No. 14/900,776, filed as application No. PCT/EP2014/063218 on Jun. 24, 2014, now Pat. No. 10,000,658.

(30) Foreign Application Priority Data

Jun. 27, 2013 (EP) ..................................... 13173948

(51) Int. Cl.
| | | |
|---|---|---|
| *C09D 155/02* | (2006.01) | |
| *C09D 4/06* | (2006.01) | |
| *C08J 5/18* | (2006.01) | |
| *B29C 45/16* | (2006.01) | |
| *B32B 15/08* | (2006.01) | |
| *B32B 27/08* | (2006.01) | |
| *C08L 25/10* | (2006.01) | |
| *C08L 25/12* | (2006.01) | |
| *C08K 5/06* | (2006.01) | |
| *C08K 5/07* | (2006.01) | |
| *B29C 45/14* | (2006.01) | |
| *C09D 5/00* | (2006.01) | |
| *C08L 55/02* | (2006.01) | |
| *B32B 15/06* | (2006.01) | |
| *B32B 15/18* | (2006.01) | |
| *B32B 15/20* | (2006.01) | |
| *B32B 27/30* | (2006.01) | |
| *B32B 1/00* | (2006.01) | |
| *C08J 7/04* | (2006.01) | |
| *C09D 7/20* | (2018.01) | |
| *C08K 5/05* | (2006.01) | |

(52) U.S. Cl.
CPC ............ *C09D 155/02* (2013.01); *B29C 45/14* (2013.01); *B29C 45/16* (2013.01); *B32B 1/00* (2013.01); *B32B 15/06* (2013.01); *B32B 15/08* (2013.01); *B32B 15/18* (2013.01); *B32B 15/20* (2013.01); *B32B 27/30* (2013.01); *C08J 5/18* (2013.01); *C08J 7/047* (2013.01); *C08L 55/02* (2013.01); *C09D 4/06* (2013.01); *C09D 5/00* (2013.01); *C09D 7/20* (2018.01); *B29C 45/14688* (2013.01); *B32B 2605/00* (2013.01); *C08J 2369/00* (2013.01); *C08J 2455/02* (2013.01); *C08K 5/05* (2013.01); *C08L 2205/04* (2013.01)

(58) Field of Classification Search
None
See application file for complete search history.

(56) References Cited

U.S. PATENT DOCUMENTS

| | | | |
|---|---|---|---|
| 3,466,347 A | 9/1969 | Davis | |
| 3,496,250 A | 2/1970 | Czerwinski | |
| 4,185,009 A | 1/1980 | Idel et al. | |
| 4,537,805 A | 8/1985 | Lin | |
| 5,235,026 A | 8/1993 | Wulff et al. | |
| 5,367,044 A | 11/1994 | Rosenquist | |
| 6,228,973 B1 | 5/2001 | McCloskey et al. | |
| 6,586,556 B2 | 7/2003 | Kratschmer et al. | |
| 6,613,869 B1 | 9/2003 | Horn et al. | |
| 7,425,358 B2 | 9/2008 | Heuer et al. | |
| 7,547,755 B2 | 6/2009 | Heuer | |
| 8,216,357 B2 * | 7/2012 | Pickett ................... | C08K 5/005 106/287.21 |
| 8,334,052 B2 | 12/2012 | Gruber et al. | |

(Continued)

FOREIGN PATENT DOCUMENTS

| | | |
|---|---|---|
| CA | 2392100 A1 | 5/2001 |
| DE | 10 31 512 B | 6/1958 |

(Continued)

OTHER PUBLICATIONS

International Search Report for PCT/EP2014/063218 dated Sep. 10, 2014.

*Primary Examiner* — Tae H Yoon

(74) *Attorney, Agent, or Firm* — Drinker Biddle & Reath LLP

(57) ABSTRACT

The present invention relates to a coating composition comprising at least one thermoplastic acrylonitrile-butadiene-styrene copolymer in a content of at least 30% by weight of the solids content of the coating composition, at least one UV-curable reactive diluent in a content of at least 30% by weight of the solids content of the coating composition, at least one photoinitiator in a content of ≥0.1 to ≤10 parts by weight of the solids content of the coating composition and at least one organic solvent, where the proportion of ethylenically unsaturated groups is at least 3 mol per kg of the solids content of the coating composition. This is used to provide films and mouldings coated therewith, having a metallizable, scratch-resistant and solvent-resistant surface.

3 Claims, No Drawings

(56) References Cited

U.S. PATENT DOCUMENTS

| | | | |
|---|---|---|---|
| 10,000,658 B2 * | 6/2018 | Kostromine | ............ B32B 15/06 |
| 2004/0183229 A1 | 9/2004 | Kunzel et al. | |
| 2005/0266165 A1 | 12/2005 | Mobius et al. | |
| 2009/0269568 A1 | 10/2009 | Kuhlmann et al. | |
| 2010/0021737 A1 | 1/2010 | Beck et al. | |
| 2013/0224476 A1 | 8/2013 | Zheng et al. | |
| 2014/0054177 A1 | 2/2014 | Grotsch et al. | |

FOREIGN PATENT DOCUMENTS

| | | |
|---|---|---|
| DE | 25 00 092 A1 | 7/1976 |
| DE | 42 40 313 A1 | 6/1994 |
| DE | 19 943 642 A1 | 3/2001 |
| DE | 19956483 A1 | 6/2001 |
| DE | 102004009437 A1 | 9/2005 |
| DE | 102004026489 B3 | 9/2005 |
| EP | 0517044 A2 | 12/1992 |
| EP | 0547593 * | 6/1993 |
| EP | 1506249 A1 | 2/2005 |
| EP | 1582549 A1 | 10/2005 |
| EP | 2113527 A1 | 11/2009 |
| GB | 1476108 A | 6/1977 |
| WO | WO-027947 A1 | 1/2002 |
| WO | WO-0226862 A1 | 4/2002 |
| WO | WO-03095521 A1 | 11/2003 |
| WO | WO-2004/082926 A2 | 9/2004 |
| WO | WO-2005113639 A1 | 12/2005 |
| WO | WO-2008037364 A1 | 4/2008 |
| WO | WO-2008043812 A2 | 4/2008 |
| WO | WO-2012/120007 A1 | 9/2012 |

\* cited by examiner

METALLIZABLE, SCRATCH-RESISTANT AND SOLVENT-RESISTANT FILM

CROSS-REFERENCE TO RELATED APPLICATIONS

This application is a continuation of U.S. patent application Ser. No. 14/900,776, filed Dec. 22, 2015, which is a national stage application (under 35 U.S.C. § 371) of PCT/EP2014/063218, filed Jun. 24, 2014, which claims benefit of European Application No. 13173948.4, filed Jun. 27, 2017, both of which are incorporated herein by reference in their entirety.

TITLE OF THE INVENTION

The present invention relates to a coating composition comprising ABS polymers, and to films coated with this coating composition. The surfaces of the coated films are metallizable, and additionally have exceptional scratch resistance and solvent resistance. The present invention further relates to 3D plastics parts comprising the inventive film, and to the use of the inventive films for production of plastics parts in film insert moulding processes.

BACKGROUND OF THE INVENTION

Film insert moulding technology has become established for the production of plastics parts in the injection moulding process. It involves first two- or three-dimensionally prefabricating the frontal surface of a part from a coated film and then filling or insert moulding it with a polymer melt from the reverse side.

It is often desirable that the front side has sufficient protection from chemical and mechanical effects. This is often achieved in the prior art by an appropriate coating or paint system on the surface. In order to avoid wet coating of the finished three-dimensional parts, it is advantageous that such a paint or coating system should already have been applied to the film which then runs through all the further forming steps with the film and is then ultimately cured, for example by UV exposure.

This gives rise to a very specific profile of properties for coated films which suit this technology. In the prior art, the term "formable hardcoating" has become established for this product class, meaning a film coating which is at first sufficiently blocking-resistant, but then can be thermally formed as desired together with the substrate and at the end receives the properties of a protective layer through UV curing.

Such a combination of properties, in the sense of blocking resistance and thermoplastic characteristics of the primary coating, together with the great latent potential for UV crosslinking, is difficult to implement.

Most of the approaches to a solution for this objective in the prior art comprise the use of macromonomers which are prepared principally by dual-cure processes, as described inter alia in Beck, Erich (BASF), Scratch resistant UV coatings for automotive applications, Pitture e Vernici, European Coatings (2006), 82(9), 10-19; Beck, Erich, Into the third dimension: three ways to apply UV coating technology to 3D-automotive objects, European Coatings Journal (2006), (4), 32, 34, 36, 38-39; Petzoldt, Joachim; Coloma, Fermin (BMS), New three-dimensionally formable hardcoat films, JOT, Journal fuer Oberflaechentechnik (2010), 50(9), 40-42; EP 2113527 A1; Petzoldt et al., Development of new generation hardcoated films for complex 3D-shaped FIM applications, RadTech Asia 2011, Conference Proceedings.

The insert moulding of these film products with, for example, polycarbonate melt (film insert moulding) results in the desired plastics parts.

Furthermore, principally for reasons of design, there exists a great need to be able to provide those plastics parts which find wide use in automobiles, in all other modes of transport, in electrical and electronic devices, in domestic appliances, in sanitary articles, in the furniture industry and in the jewellery industry with a metal layer such as, more particularly, a chromium layer. In this way, the advantages of the plastic, for example free shaping and low weight, are combined with the high-quality appearance of metal surfaces. Also of interest are partially metallized components, with part of the area left without metallization for emblems, scales or viewing windows. These areas have to meet the high demands on media resistance that are placed on coated plastics parts, for example with respect to skin creams, cockpit care products, solvents, and a certain scratch resistance. Uncoated thermoplastics, for example the acrylonitrile-butadiene-styrene copolymer (ABS) which is of very good suitability for the desired galvanization, are inadequate in relation to solvent resistance and scratch resistance, measured, for example, by customary demands for the automobile interior or higher-quality electrical and electronic devices.

The process of galvanization of plastics is described in detail in the literature, for example in B. D. Rathmann in Chemie in unserer Zeit 15 (6) 1981, page 201 ff. and D. Bernd in Kunststoffgalvanisierung in der Praxis [Plastics Galvanization in Practice], Crash Course at Kunststoffinstitut Lüdenscheid 2012, Conference Book. It is known in the prior art that the plastics of best suitability for such a galvanization include ABS copolymers. Polycarbonate/ABS coextrusion films, as described, for example, in WO 2012/120007 A1, are in need of improvement in two aspects: As a result of the coextrusion process, ABS layers of this kind cannot be thinner than 15-20 µm. At thicknesses of 20 µm upwards, these layers are not as transparent as would be desired in some applications. Moreover, ABS layers of this kind do not meet the demands indicated on solvent resistance, and therefore cannot be regarded as a protective layer for plastics parts, as is actually expected from a layer which forms the surface of the film or of a moulded component thereof.

For these reasons, there is a great need in industry for coated films having a coating which firstly has adequate blocking resistance for further processing after the application and first drying operation, and secondly has a certain scratch resistance and solvent resistance after curing by means of UV light, for example, and is additionally also galvanizable. The fulfilment of such a profile of properties with the combination of properties mentioned constitutes a particular challenge to the person skilled in the art.

BRIEF SUMMARY OF THE INVENTION

It has been found that, surprisingly, thermally formable films having such a combination of properties of the coated surface can be obtained when they are coated with a coating composition comprising at least one thermoplastic acrylonitrile-butadiene-styrene copolymer in a content of at least 30% by weight of the solids content of the coating composition, at least one UV-curable reactive diluent in a content of at least 30% by weight of the solids content of the coating composition, at least one photoinitiator in a content of ≥0.1 to ≤10 parts by weight of the solids content of the coating composition and at least one organic solvent, and the proportion of ethylenically unsaturated groups is at least 3 mol per kg of the solids content of the coating composition.

DETAILED DESCRIPTION OF THE INVENTION

The present invention therefore provides the following: a coating composition comprising
(a) at least one thermoplastic acrylonitrile-butadiene-styrene copolymer in a content of at least 30% by weight of the solids content of the coating composition;
(b) at least one UV-curable reactive diluent in a content of at least 30% by weight of the solids content of the coating composition;
(c) at least one photoinitiator in a content of ≥0.1 to ≤10 parts by weight of the solids content of the coating composition; and
(d) at least one organic solvent,
where the proportion of ethylenically unsaturated groups is at least 3 mol per kg of the solids content of the coating composition.

The inventive coating composition can be obtained in a simple and efficient manner. In addition, it is possible to galvanize coatings obtainable thereby on many surfaces such as, more particularly, those for the films which are candidates in a film insert moulding process as desired, i.e. to coat them with a metal layer. Surprisingly, the layers obtained with the inventive coating composition additionally have adequate blocking resistance after drying, can then be thermally formed as desired together with the coated substrate, and receive a scratch-resistant and solvent-resistant surface after curing, for example by means of UV radiation.

The scratch resistance can be determined, for example, using the pencil hardness, as measurable on the basis of ASTM D 3363. An assessment of solvent resistance can be made on the basis of EN ISO 2812-3:2007. It is remarkable that the surface of the moulding obtained by the inventive coating of the film with the coating composition and final curing by UV radiation has good durability, even with respect to acetone, a solvent which is otherwise very harmful to polycarbonate surfaces.

Acrylonitrile-butadiene-styrene copolymers, as used in the inventive coating composition, are thermoplastics commonly known by the abbreviation ABS (DIN EN ISO 1043-1 and DIN ISO 1629). The Vicat softening point (ISO 306 VST/B/50 (50 N)) of the ABS copolymers for use in accordance with the invention is preferably around 100° C., more preferably at least 95° C. Preference is given to ABS copolymers having an acrylonitrile content in the range of ≥19 and ≤35%, more preferably in the range of ≥20 to ≤30%, most preferably in the range of ≥22 to ≤25%. The proportion of the polybutadiene in the ABS copolymers is preferably in the range of ≥10 to ≤16%, more preferably in combination with the preferred ranges for the acrylonitrile content. The remainder of the respective proportions in the ABS copolymers comprises polymerized styrene derivatives. Preference is given here to styrene.

ABS copolymers are on the market in large volumes as commercial products. Known products advantageously usable in the context of the present invention include those available under the Novodur (manufacturer: Styrolution) and Magnum (manufacturer: Styron) brand names. Particular preference is given to Novodur N H604.

The polymer is an essential part of the inventive coating composition and of the inventive coating. The proportion of the at least one ABS copolymer in the solids content of the coating composition is at least 30% by weight, preferably at least 40% by weight, more preferably at least 45% by weight.

Reactive diluents usable with preference as component (b) of the inventive coating composition are bifunctional, trifunctional, tetrafunctional, pentafunctional or hexafunctional acrylic and/or methacrylic monomers. Preference is given to ester functions, especially acrylic ester functions. Suitable polyfunctional acrylic acid and/or methacrylic esters derive from aliphatic polyhydroxyl compounds having at least 2, preferably at least 3 and more preferably at least 4 hydroxyl groups, and preferably 2 to 12 carbon atoms.

Examples of such aliphatic polyhydroxyl compounds are ethylene glycol, propylene glycol, butane-1,4-diol, hexane-1,6-diol, diethylene glycol, triethylene glycol, glycerol, trimethylolpropane, pentaerythritol, dipentaerythritol, tetramethylolethane and sorbitan. Examples of esters of said polyhydroxyl compounds, said esters being suitable with preference in accordance with the invention as bi- to hexafunctional acrylic and/or methacrylic monomers for the reactive diluent, are glycol diacrylate and dimethacrylate, butanediol diacrylate or dimethacrylate, dimethylolpropane diacrylate or dimethacrylate, diethylene glycol diacrylate or dimethacrylate, divinylbenzene, trimethylolpropane triacrylate or trimethacrylate, glyceryl triacrylate or trimethacrylate, pentaerythrityl tetraacrylate or tetramethacrylate, dipentaerythrityl penta-/hexaacrylate (DPHA), butane-1,2,3,4-tetraol tetraacrylate or tetramethacrylate, tetramethylolethane tetraacrylate or tetramethacrylate, 2,2-dihydroxypropane-1,3-diol tetraacrylate or tetramethacrylate, diurethane dimethacrylate (UDMA), sorbitan tetra-, penta- or hexaacrylate or the corresponding methacrylates. It is also possible to use additionally mixtures of crosslinking monomers having two to four or more ethylenically unsaturated, free-radically polymerizable groups.

Additionally in accordance with the invention, it is possible to use, as reactive diluents or as components b) of the inventive coating composition, alkoxylated di-, tri-, tetra-, penta- and hexaacrylates or -methacrylates. Examples of alkoxylated diacrylates or -methacrylates are alkoxylated, preferably ethoxylated, methanediol diacrylate, methanediol dimethacrylate, glyceryl diacrylate, glyceryl dimethacrylate, neopentyl glycol diacrylate, neopentyl glycol dimethacrylate, 2-butyl-2-ethylpropane-1,3-diol diacrylate, 2-butyl-2-ethylpropane-1,3-diol dimethacrylate, trimethylolpropane diacrylate or trimethylolpropane dimethacrylate.

Examples of alkoxylated triacrylates or -methacrylates are alkoxylated, preferably ethoxylated, pentaerythrityl triacrylate, pentaerythrityl trimethacrylate, glyceryl triacrylate, glyceryl trimethacrylate, butane-1,2,4-triol triacrylate, butane-1,2,4-triol trimethacrylate, trimethylolpropane triacrylate, trimethylolpropane trimethacrylate, tricyclodecanedimethanol diacrylate, tricyclodecanedimethanol dimethacrylate, ditrimethylolpropane tetraacrylate or ditrimethylolpropane tetramethacrylate.

Examples of alkoxylated tetra-, penta- or hexaacrylates are alkoxylated, preferably ethoxylated, pentaerythrityl tetraacrylate, dipentaerythrityl tetraacrylate, dipentaerythrityl pentaacrylate, dipentaerythrityl hexaacrylate, pentaerythrityl tetramethacrylate, dipentaerythrityl tetramethacrylate, dipentaerythrityl pentamethacrylate or dipentaerythrityl hexamethacrylate. In the alkoxylated diacrylates or -methacrylates, triacrylates or -methacrylates, tetraacrylates or -methacrylates, pentaacrylates or -methacrylates and/or alkoxylated hexaacrylates or -methacrylates in component b), all the acrylate groups or methacrylate groups or only some of the acrylate groups or methacrylate groups in the respective monomer may be bonded to the corresponding radical via alkylene oxide groups. It is also possible to use any desired mixtures of such wholly or partly alkoxylated di-, tri-, tetra-, penta- or hexaacrylates or -methacrylates. In this case, it is also possible that the acrylate or methacrylate group(s) is/are bonded to the aliphatic, cycloaliphatic or aromatic radical of the monomer via a plurality of successive alkylene oxide groups, preferably ethylene oxide groups. The mean number of alkylene oxide or ethylene oxide groups in the monomer is stated by the alkoxylation level or ethoxylation level. The alkoxylation level or ethoxylation level may preferably be from 2 to 25, particular preference being given to alkoxylation levels or ethoxylation levels of 2 to 15, most preferably of 3 to 9.

Likewise in accordance with the invention, reactive diluents or components b) of the inventive coating composition may be oligomers which belong to the class of the aliphatic urethane acrylates or of the polyester acrylates or polyacryloylacrylates. The use thereof as paint binders is known and is described in Chemistry & Technology of UV & EB Formulation for Coatings, Inks & Paints, vol. 2, 1991, SITA Technology, London (P.K.T. Oldring (ed.) on p. 73-123 (Urethane Acrylates) and p. 123-135 (Polyester Acrylates). Commercially available examples which are suitable within the inventive context include aliphatic urethane acrylates such as Ebecryl® 4858, Ebecryl® 284, Ebecryl® 265, Ebecryl® 264, Ebecryl® 8465, Ebecryl® 8402 (each manufactured by Cytec Surface Specialities), Craynor® 925 from Cray Valley, Viaktin® 6160 from Vianova Resin, Desmolux VP LS 2265 from Bayer MaterialScience AG, Photomer 6891 from Cognis, or else aliphatic urethane acrylates dissolved in reactive diluents, such as Laromer® 8987 (70% in hexanediol diacrylate) from BASF AG, Desmolux U 680 H (80% in hexanediol diacrylate) from Bayer MaterialScience AG, Craynor® 945B85 (85% in hexanediol diacrylate), Ebecryl® 294/25HD (75% in hexanediol diacrylate), Ebecryl® 8405 (80% in hexanediol diacrylate), Ebecryl® 4820 (65% in hexanediol diacrylate) (each manufactured by Cytec Surface Specialities) and Craynor® 963B80 (80% in hexanediol diacrylate), each from Cray Valley, or else polyester acrylates such as Ebecryl® 810, 830, or polyacryloylacrylates such as Ebecryl®, 740, 745, 767 or 1200 from Cytec Surface Specialities.

In a further preferred embodiment, the reactive diluent (b) comprises alkoxylated diacrylates and/or dimethacrylates, alkoxylated triacrylates and/or trimethacrylates, alkoxylated tetraacrylates and/or tetramethacrylates, alkoxylated pentaacrylates and/or pentamethacrylates, alkoxylated hexaacrylates and/or hexamethacrylates, aliphatic urethane acrylates, polyester acrylates, polyacryloylacrylates and mixtures thereof.

In a further preferred embodiment, the reactive diluent (b) of the inventive coating composition comprises dipentaerythrityl penta-/hexaacrylate.

The invention also encompasses mixtures of the abovementioned crosslinking multifunctional monomers with monofunctional monomers such as, more particularly, methyl methacrylate. The proportion of the multifunctional monomers in such a mixture is preferably at least 20% by weight.

The reactive diluent is an essential part of the inventive coating composition and of the inventive coating. The total proportion of the at least one reactive diluent in the solids content of the coating composition is at least 30% by weight, preferably at least 40% by weight, more preferably at least 45% by weight.

The content of ethylenically unsaturated groups has a significant influence on the achievable durability properties of the radiation-cured coating. Therefore, the inventive coating composition contains a content of ethylenically unsaturated groups of at least 3.0 mol per kg of solids content of the coating composition, preferably at least 3.5 mol per kg, more preferably at least 4.0 mol per kg of solids content of the coating composition. This content of ethylenically unsaturated groups is also well known to the person skilled in the art by the term "double bond density".

The term "at least one photoinitiator" in the inventive coating composition encompasses the standard, commercially available compounds known to those skilled in the art, for example α-hydroxyketones, benzophenone, α,α-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl o-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, bisacylphosphine oxide and others, said photoinitiators being utilizable alone or in a combination of two or more or in combination with one of the above polymerization initiators.

UV photoinitiators used may, for example, be IRGACURE® products from BASF, for example the products IRGACURE® 184, IRGACURE® 500, IRGACURE® 1173, IRGACURE®2959, IRGACURE® 745, IRGACURE® 651, IRGACURE® 369, IRGACURE® 907, IRGACURE® 1000, IRGACURE® 1300, IRGACURE® 819, IRGACURE® 819DW, IRGACURE® 2022, IRGACURE® 2100, IRGACURE® 784, IRGACURE® 250; in addition, the DAROCUR® products from BASF may be used, for example the products DAROCUR® MBF, DAROCUR® 1173, DAROCUR® TPO, DAROCUR® 4265. Another example of a UV photoinitiator usable in the inventive coating composition can be purchased under the Esacure One trade name from the manufacturer Lamberti.

Photoinitiators are present in the coating composition in the range from ≥0.1 to ≤10 parts by weight of the solids content of the coating composition.

The coating composition should additionally contain, over and above the 100 parts by weight of components (a), (b) and (c), one or more organic solvents.

Suitable solvents are particularly those that do not attack polycarbonate polymers. Such solvents are preferably alcohols. In a preferred embodiment of the present invention, the solvent (d) is selected from 1-methoxy-2-propanol, diacetone alcohol, 2,2,3,3-tetrafluoropropanol and mixtures thereof. Most preferably, the at least one solvent (d) comprises a mixture of 1-methoxy-2-propanol and at least 50% by weight of diacetone alcohol.

The coating material composition thus preferably contains, in addition to the 100 parts by weight of components (a) to (c), 0 to 900 parts by weight, more preferably 100 to 850 parts by weight, most preferably 200 to 800 parts by weight, of the at least one organic solvent.

The coating composition may additionally optionally contain, over and above the 100 parts by weight of components (a), (b) and (c), one or more further coatings additives. Such coatings additives may be selected, for example, from the group comprising stabilizers, levelling agents, surface additives, pigments, dyes, inorganic nanoparticles, adhesion promoters, UV absorbers, IR absorbers, preferably from the group comprising stabilizers, levelling agents, surface additives and inorganic nanoparticles. The coating composition may preferably contain, in addition to the 100 parts by weight of components 1) to 3), 0 to 40 parts by weight, more preferably 0 to 30 parts by weight, most preferably 0.1 to 20 parts by weight, of at least one further coatings additive. Preferably, the total proportion of all the coatings additives present in the coating material composition is 0 to 40 parts by weight, more preferably 0 to 30 parts by weight, most preferably 0.1 to 20 parts by weight.

The coating material composition may comprise inorganic nanoparticles to increase the mechanical durability, for example scratch resistance and/or pencil hardness.

Useful nanoparticles include inorganic oxides, mixed oxides, hydroxides, sulphates, carbonates, carbides, borides and nitrides of elements of main group II to IV and/or elements of transition group Ito VIII of the Periodic Table, including the lanthanides. Preferred nanoparticles are silicon oxide, aluminium oxide, cerium oxide, zirconium oxide, niobium oxide, zinc oxide or titanium oxide nanoparticles, particular preference being given to silicon oxide nanoparticles.

The particles used preferably have mean particle sizes (measured by means of dynamic light scattering in dispersion, determined as the Z-average) of less than 200 nm, preferably of 5 to 100 nm, more preferably 5 to 50 nm. Preferably at least 75%, more preferably at least 90%, even more preferably at least 95%, of all the nanoparticles used have the sizes defined above.

The coating composition can be produced in a simple manner by first of all completely dissolving or colloidally dispersing the polymer in the solvent at room temperature or at elevated temperatures and then the other obligatory and any optional components to the solution which has been cooled down to room temperature, either combining them in the absence of solvent(s) and mixing them together by stirring, or in the presence of solvent(s), for example adding them to the solvent(s), and mixing them together by stirring. Preferably, first the photoinitiator is dissolved in the solvent(s) and then the further components are added. This is optionally followed by a purification by means of filtration, preferably by means of fine filtration.

The present invention further provides a laminate comprising a substrate and a surface coating obtainable by coating the substrate with the coating composition according to the present invention. This provides, in accordance with the invention, a coated substrate having advantageous surface properties in terms of scratch resistance, solvent resistance and metallizable surface.

Since the metallization of surfaces in the field of production of plastics parts by means of the film insert moulding process is of particular significance, and since the present invention advantageously achieves an improvement, the substrate to be coated, according to the present invention, preferably comprises a film.

Therefore, the present invention further provides a coated film comprising a film of a thermoplastic polymer and a coating obtainable by coating with the inventive coating composition.

Films used for coating are preferably thermoplastics such as polycarbonate, polyacrylate or poly(meth)acrylate, polysulphones, polyesters, thermoplastic polyurethane and polystyrene, and the copolymers and mixtures (blends) thereof. Suitable thermoplastics are, for example, polyacrylates, poly(meth)acrylates (e.g. PMMA; e.g. Plexiglas® from the manufacturer Röhm), cycloolefin copolymers (COC; e.g. Topas® from the manufacturer Ticona; Zenoex® from the manufacturer Nippon Zeon or Apel® from the manufacturer Japan Synthetic Rubber), polysulphones (Ultrason@ from the manufacturer BASF or Udel® from the manufacturer Solvay), polyesters, for example PET or PEN, polycarbonate (PC), polycarbonate/polyester blends, e.g. PC/PET, polycarbonate/polycyclohexylmethanol cyclohexanedicarboxylate (PCCD; Xylecs® from GE), polycarbonate/PBT and mixtures thereof.

In a particularly advantageous and preferred embodiment of the present invention, the film of the inventive laminate or the thermoplastic polymer of the film coated in accordance with the invention comprises polycarbonate or copolycarbonate.

Suitable polycarbonates for the production of the inventive polycarbonate compositions are all the known polycarbonates. These are homopolycarbonates, copolycarbonates and thermoplastic polyester carbonates. The suitable polycarbonates preferably have mean molecular weights $\overline{M}_w$ of 18 000 to 40 000, preferably of 26 000 to 36 000 and especially of 28 000 to 35 000, determined by measuring the relative solution viscosity in dichloromethane or in mixtures of equal weights of phenol/o-dichlorobenzene, calibrated by light scattering.

The polycarbonates are preferably prepared by the interfacial process or the melt transesterification process, which have been described many times in the literature. With regard to the interfacial process, reference is made by way of example to H. Schnell, Chemistry and Physics of Polycarbonates, Polymer Reviews, vol. 9, Interscience Publishers, New York 1964 p. 33 ff., to Polymer Reviews, vol. 10, "Condensation Polymers by Interfacial and Solution Methods", Paul W. Morgan, Interscience Publishers, New York 1965, ch. VIII, p. 325, to Drs. U. Grigo, K. Kircher and P. R- Müller "Polycarbonate" [Polycarbonates] in Becker/Braun, Kunststoff-Handbuch [Polymer Handbook], volume 3/1, Polycarbonate, Polyacetale, Polyester, Celluloseester [Polycarbonates, Polyacetals, Polyesters, Cellulose Esters], Carl Hanser Publishers, Munich, Vienna, 1992, p. 118-145, and to EP 0 517 044 A1. The melt transesterification process is described, for example, in the Encyclopedia of Polymer Science, vol. 10 (1969), Chemistry and Physics of Polycarbonates, Polymer Reviews, H. Schnell, vol. 9, John Wiley and Sons, Inc. (1964), and in patent specifications DE-B 10 31 512 and U.S. Pat. No. 6,228,973.

The polycarbonates can be obtained from reactions of bisphenol compounds with carbonic acid compounds, especially phosgene, or diphenyl carbonate or dimethyl carbonate in the melt transesterification process. Particular preference is given here to homopolycarbonates based on bisphenol A and copolycarbonates based on monomers bisphenol A and 1,1-bis(4-hydroxyphenyl)-3,3,5-trimethyl-cyclohexane. Further bisphenol compounds which can be used for the polycarbonate synthesis are disclosed, inter alia, in WO 2008/037364 A1, EP 1 582 549 A1, WO 2002/026862 A1 and WO 2005/113639 A1.

The polycarbonates may be linear or branched. It is also possible to use mixtures of branched and unbranched polycarbonates.

Suitable branching agents for polycarbonates are known from the literature and are described, for example, in patent specifications U.S. Pat. No. 4,185,009 B1, DE 25 00 092 A1, DE 42 40 313 A1, DE 19 943 642 A1, U.S. Pat. No. 5,367,044 B1, and in literature cited therein. Furthermore, the polycarbonates used may also be intrinsically branched, in which case no branching agent is added in the course of polycarbonate preparation. One example of intrinsic branches is that of so-called Fries structures, as disclosed for melt polycarbonates in EP 1 506 249 A1.

In addition, it is possible to use chain terminators in the polycarbonate preparation. The chain terminators used are preferably phenols such as phenol, alkylphenols such as cresol and 4-tert-butylphenol, chlorophenol, bromophenol, cumylphenol or mixtures thereof.

The polymer composition(s) of the film or of the thermoplastic polymer of the 3D moulding may additionally comprise additives, for example UV absorbers, IR absorbers and other customary processing aids, especially demoulding agents and fluxes, and also the customary stabilizers, especially thermal stabilizers, and also antistats, pigments, colourants and optical brighteners. In every layer, different additives or concentrations of additives may be present.

Coatings obtainable by coating with the inventive coating composition, i.e. the coated films of the invention, are particularly advantageously suitable for coating with a metal layer. In a further preferred embodiment, the coated film of the invention therefore comprises a metal layer on the coated surface. The metal layer preferably comprises at least one metal selected from the group consisting of tin, lead, silver, gold, palladium, platinum, cobalt, manganese, bismuth, copper, nickel, iron, chromium and mixtures thereof, preferably nickel, silver, gold, palladium, platinum, copper and chromium, more preferably nickel, gold, palladium, copper and chromium.

The present invention further provides a process for producing a coated film, comprising the steps of
(i) coating a film with a coating composition according to the present invention;
(ii) drying the coating;
(iii) optionally cutting the film to size and/or delaminating, printing and/or thermally or mechanically forming the film; and
(iv) irradiating the coating with UV radiation to cure the coating.

The film can be coated with the coating composition by the standard methods for coating films with fluid coating compositions, for example by knife-coating, spraying, pouring, flow-coating, dipping, rolling or spin-coating. The flow-coating process can be effected manually with a hose or suitable coating head, or automatically in a continuous run by means of flow-coating robots and optionally slot dies. Preference is given to the application of the coating composition by a roll-to-roll transfer. In this case, the surface of the film to be coated may be pretreated by cleaning or activation.

The drying follows the application of the coating composition to the film. For this purpose, more particularly, elevated temperatures in ovens, and moving and optionally also dried air, for example in convection ovens or by means of nozzle dryers, and thermal radiation such as IR and/or NIR, are employed. In addition, it is possible to use microwaves. It is possible and advantageous to combine a plurality of these drying processes. The drying of the coating in step (ii) preferably comprises flash-off at room temperature and/or elevated temperature, such as preferably at 20-200° C., more preferably at 40-120° C. After the coating has been dried, it is blocking-resistant, and so the coated substrate, especially the coated film, can be laminated, printed and/or thermally formed. Forming in particular is preferred in this context, since merely the forming of a coated film here can define the mould for a film insert moulding process for production of a three-dimensional plastics part.

Advantageously, the conditions for the drying are selected such that the elevated temperature and/or the thermal radiation does not trigger any polymerization (crosslinking) of the acrylate or methacrylate groups, since this can impair formability. In addition, the maximum temperature attained should appropriately be selected at a sufficiently low level that the film does not deform in an uncontrolled manner.

After the drying/curing step, the coated film, optionally after lamination with a protective film on the coating, can be rolled up. The film can be rolled up without the coating sticking to the reverse side of the substrate film or of the laminating film. However, it is also possible to cut the coated film to size and to send the cut sections individually or as a stack to further processing. Particular preference is given in this context to the thermal forming of the coated film to a three-dimensional mould, as undertaken as a preparatory step for insert moulding of the film with a thermoplastic polymer such as polycarbonate in a film insert moulding process. In a preferred embodiment, step (iii) comprises the cutting-to-size and thermal forming of the coated film.

Curing with actinic radiation is understood to mean the free-radical polymerization of ethylenically unsaturated carbon-carbon double bonds by means of initiator radicals which are released, for example, from the above-described photoinitiators through irradiation with actinic radiation.

The radiative curing is preferably effected by the action of high-energy radiation, i.e. UV radiation or daylight, for example light of wavelength $\geq 200$ nm to $\leq 750$ nm, or by irradiation with high-energy electrons (electron beams, for example $\geq 90$ keV to $\leq 300$ keV). The radiation sources used for light or UV light are, for example, moderate- or high-pressure mercury vapour lamps, wherein the mercury vapour may be modified by doping with other elements such as gallium or iron. Lasers, pulsed lamps (known by the name UV flashlight emitters), halogen lamps or excimer emitters are likewise usable. The emitters may be installed at a fixed location, such that the material to be irradiated is moved past the radiation source by means of a mechanical device, or the emitters may be mobile, and the material to be irradiated does not change position in the course of curing. The radiation dose typically sufficient for crosslinking in the case of UV curing is in the range from $\geq 80$ mJ/cm$^2$ to $\leq 5000$ mJ/cm$^2$.

In a preferred embodiment, the actinic radiation is therefore light in the UV light range.

The radiation can optionally be performed with exclusion of oxygen, for example under inert gas atmosphere or reduced-oxygen atmosphere. Suitable inert gases are preferably nitrogen, carbon dioxide, noble gases or combustion gases. In addition, the radiation can be effected by covering the coating with media transparent to the radiation. Examples thereof are polymer films, glass or liquids such as water.

According to the radiation dose and curing conditions, the type and concentration of any initiator used can be varied or optimized in a manner known to those skilled in the art or by exploratory preliminary tests. For curing of the formed films, it is particularly advantageous to conduct the curing with several emitters, the arrangement of which should be selected such that every point on the coating receives substantially the optimal radiation dose and intensity for curing. More particularly, unirradiated regions (shadow zones) should be avoided.

In addition, according to the film used, it may be advantageous to select the irradiation conditions such that the thermal stress on the film does not become too great. In particular, thin films and films made from materials having a low glass transition temperature can have a tendency to uncontrolled deformation when a particular temperature is exceeded as a result of the irradiation. In these cases, it is advantageous to allow a minimum level of infrared radiation to act on the substrate, by means of suitable filters or a suitable design of the emitters. In addition, reduction of the corresponding radiation dose can counteract uncontrolled deformation. However, it should be noted that a particular dose and intensity in the irradiation are needed for maximum polymerization. It is particularly advantageous in these cases to conduct curing under inert or reduced-oxygen conditions, since the required dose for curing decreases when the oxygen content is reduced in the atmosphere above the coating.

Particular preference is given to using mercury emitters in fixed installations for curing. In that case, photoinitiators are used in concentrations of ≥0.1% by weight to ≤10% by weight, more preferably of ≥0.2% by weight to ≤3.0% by weight, based on the solids content of the coating. These coatings are preferably cured using a dose of ≥80 mJ/cm² to ≤5000 mJ/cm².

Optional insert moulding of the coated film with a thermoplastic polymer, such as polycarbonate, in a step (v) on completion of curing of the film coating and the optional, usually desirable, forming of the coated film is well known to the person skilled in the art in the form of the film insert moulding process as described, for example, in WO 2004/082926 A1 and WO 02/07947 A1. In a preferred embodiment of the process according to the invention, the reverse coating of the film in a step (v) is effected by means of extrusion or injection moulding, preferably with polycarbonate melt. The processes of extrusion and of injection moulding for this purpose are well known to those skilled in the art and are described, for example, in "Handbuch Spritzgießen" [Injection Moulding Handbook], Friedrich Johannnaber/Walter Michaeli, Munich; Vienna: Hanser, 2001, ISBN 3-446-15632-1 or "Anleitung zum Bau von Spritzgießwerkzeugen" [Introduction to the Construction of Injection Moulds], Menges/Michaeli/Mohren, Munich; Vienna: Hanser, 1999, ISBN 3-446-21258-2.

After curing by irradiation with UV light, the coated surface of the coated polycarbonate film produced in this way then has the inventive combination of properties in terms of scratch resistance, solvent resistance and metallizability. In this way, it is likewise possible by means of the inventive insert moulding of the coated film with a thermoplastic polymer, as is customary in film insert moulding processes, to produce mouldings having surfaces consisting of the inventive coating of the inventive film and having desired properties such as scratch resistance, solvent resistance and metallizability.

The inventive coating can be metallized by known processes for plastics galvanization from the prior art. In a further preferred embodiment, the process of the invention therefore comprises a further step (vi) of coating the surface with a metallic coating.

In these processes, one option is to first etch the polymer surface in order to roughen or chemically alter it. This can be done, for example, by means of mineral acids, chromic acid, sulphuric acid or acidic or alkaline permanganate solutions. Further pretreatment methods known from the prior art include a plasma treatment or treatment with oxidizing etchants.

For example, the etching operation roughens or chemically alters the polymer surface such that adhesion between plastic and metal coating is enabled. The etched plastics parts are rinsed and then activated. In the prior art, different methods for activation of the polymer surfaces are known. For example, a known method is to activate the polymer surfaces with noble metals, for example colloidal palladium, ionogenic palladium or silver colloids. A further known method is to use metals which form sparingly soluble sulphides or polysulphides as activators for the direct metallization. In this context, tin, lead, silver, bismuth, cobalt, manganese and copper in particular have been found to be suitable.

The activation may be followed either by an electroless metallization of the surface to form a conductive layer, followed by a subsequent electrolytic layer formation, or by a direct chemical metal deposition. In the case of use of palladium activation, this metal deposition is typically effected from an acidic copper bath, whereas, in the case of use of sulphide or polysulphide activators, metal is deposited from a nickel bath, as described, for example, in DE 102004026489 B3. In addition, step (vi) may preferably encompass those process steps described in WO 2012/120007 A1 at page 19 line 9 to page 20 line 4. This text passage of WO 2012/120007 A1 and the corresponding description are hereby explicitly incorporated by reference.

In a preferred embodiment, the process of the invention comprises steps (i), (ii), (iii), (iv) and (v). In this way, a 3D moulding is obtained, the surface of which is scratch-resistant and solvent-resistant, and which is advantageously metallizable. Therefore, in a further advantageous configuration of this embodiment, the process includes the further step (vi). In this way, a 3D moulding made from plastic with a metallic surface is provided. In a further preferred embodiment, the process of the invention comprises steps (i), (ii), (iii), (iv) and (vi). In this way, a formed polymer film, preferably a polycarbonate film, provided with a metallic coating is provided.

On account of the advantageous combination of properties of scratch resistance, solvent resistance and metallizability of the surfaces of the coated films of the invention, these films are particularly suitable for production of 3D plastics parts, especially those which are obtained by film insert moulding processes. The surfaces of the plastics parts thus have the particular properties of the inventive films. The present invention therefore further provides a 3D plastics part comprising the coated film of the invention, especially the coated polycarbonate film, preferably with a metal layer on the coated film. In a particularly preferred embodiment, the 3D plastics part according to the present invention is obtainable by a film insert moulding process. Processes of this kind include the insert moulding, for example by injection moulding, of the inventive coated polycarbonate films with a thermoplastic polymer, especially with polycarbonate.

Therefore, the present invention further provides for the use of the coated film of the invention, especially of the coated polycarbonate film of the invention, for production of plastics parts in film insert moulding processes. In a particularly preferred embodiment, the inventive use comprises the production of plastics parts for the automotive, transport, electricals, electronics and construction industries in film insert moulding processes.

The present invention thus further provides a moulded component comprising at least one coated film according to the present invention, especially a moulded component where the coating of the coated film comprises at least one metal layer on the surface.

EXAMPLES

Assessment Methods
Layer Thickness
The layer thickness of the coatings was measured by observing the cutting edge in an Axioplan optical microscope manufactured by Zeiss. Method—reflected light, bright field, magnification 500×.

Assessment of Blocking Resistance

Conventional test methods as described, for instance, in DIN 53150 are insufficient to simulate the blocking resistance of rolled-up, pre-dried, coated films, and therefore the following test was employed: The coating materials were applied to Makrofol DE 1-1 (375 μm) with a conventional coating bar (target wet film thickness 100 μm). After a flash-off phase at 20° C. to 25° C. for 10 min, the coated films were dried in an air circulation oven at 110° C. for 10 min. After a cooling phase for 1 min, a commercial GH-X173 natur pressure-sensitive lamination film (manufacturer: Bischof und Klein, Lengerich, Germany) was applied without creasing to the dried coated film with a plastic roller over an area of 100 mm×100 mm. Subsequently, the laminated film piece was subjected to a weight of 10 kg over the full area for 1 hour. Thereafter, the lamination film was removed and the coated surface was assessed visually.

Assessment of Pencil Hardness

The pencil hardness was measured analogously to ASTM D 3363 using an Elcometer 3086 Scratch boy (Elcometer Instruments GmbH, Aalen, Germany) under a load of 500 g, unless stated otherwise.

Assessment of Steel Wool Scratching

The steel wool scratching was determined by sticking a piece of No. 00 steel wool (Oskar Weil GmbH Rakso, Lahr, Germany) onto the flat end of a 500 g fitter's hammer, the area of the hammer being 2.5 cm×2.5 cm, i.e. approximately 6.25 cm². The hammer was placed onto the surface to be tested without applying additional pressure, such that a defined load of about 560 g was attained. The hammer was then moved back and forth 10 times in twin strokes. Subsequently, the stressed surface was cleaned with a soft cloth to remove fabric residues and coating particles. The scratching was characterized by haze and gloss values, measured transverse to the scratching direction, with a Micro HAZE plus (20° gloss and haze; Byk-Gardner GmbH, Geretsried, Germany). The measurement was effected before and after scratching. The differential values for gloss and haze before and after stress are reported as Δgloss and Δhaze.

Assessment of Solvent Resistance

The solvent resistance of the coatings was typically tested with isopropanol, xylene, 1-methoxy-2-propyl acetate, ethyl acetate, acetone, in technical-grade quality. The solvents were applied to the coating with a cotton bud soaked therewith and protected from vaporization by covering. Unless stated otherwise, a contact time of 60 minutes at about 23° C. was observed. After the end of the contact time, the cotton bud was removed and the test surface was wiped clean with a soft cloth. The inspection was immediately effected visually and after gentle scratching with a fingernail.

A distinction is made between the following levels:

0=unchanged; no change visible; cannot be damaged by scratching.
1=slight swelling visible, but cannot be damaged by scratching.
2=change clearly visible, can barely be damaged by scratching.
3=noticeable change, surface destroyed after firm fingernail pressure.
4=significant change, scratched through to the substrate after firm fingernail pressure.
5=destroyed; the coating is already destroyed when the chemical is wiped away; the test substance cannot be removed (has eaten into the surface).

Within this assessment, the test is typically passed with the ratings of 0 and 1. Ratings of >1 represent a "fail".

Example 1

Production of a Coating Composition 117 g of Novodur®N H604 (manufacturer: Styrolution) were distributed homogeneously in 284 g of a mixture (2:3) of 1-methoxy-2-propanol and diacetone alcohol at 100° C. within about 3 h. The stable colloidal solution obtained in this way was cooled down to about 30° C. Separately, the following components were dissolved in 166 g of the mixture (2:3) of 1-methoxy-2-propanol and diacetone alcohol at room temperature: 117 g of dipentaerythrityl penta-/hexaacrylate (DPHA, manufacturer: Cytec), 4.7 g of Esacure One (manufacturer: Lamberti), 2.35 g of Darocur 4265 (manufacturer: BASF) and 0.25 g of BYK 333 (manufacturer: BYK). The second solution was added to the polymer solution while stirring. The coating composition obtained was stirred at room temperature and with shielding from direct incidence of light for another 3 h, dispensed and left to stand for 1 day. The yield was 665 g, the viscosity (23° C., DIN EN ISO 3219) was 1050 mPas, the solids content was 35% by weight and the calculated double bond density in the solids content of the coating material was about 5.1 mol/kg.

Example 2

Testing of the Solubility of Various ABS Products

For the testing, various commercially available ABS products were used. The solubility was tested in a mixture (2:3) of 1-methoxy-2-propanol (MP-ol) and diacetone alcohol (DAA). For the testing, the aim was a use-relevant concentration of 20% by weight of the polymer in each solvent. The dissolution test was conducted at 120° C. while stirring for 4 h. Then an intermediate result was registered. The solution was then allowed to cool to room temperature and the final result was registered.

| | Composition, % by wt. | | | MP-ol/DAA = 2:3 | |
|---|---|---|---|---|---|
| | Acrylo-nitrile | Styrene | Poly-buta-diene | 120° C. | 20° C. |
| Novodur N H950 | 40# | 43# | 17# | two phases | two phases |
| Novodur N H604 | 23# | 61# | 16# | homogeneous cloudy blend | homogeneous cloudy blend |
| Magnum 3404 | 24# | 66# | 10# | homogeneous cloudy blend | homogeneous cloudy blend |
| Magnum 3904 | 23# | 62# | 15# | homogeneous cloudy blend | homogeneous cloudy blend |
| Magnum 3616 | 24# | 62# | 14# | homogeneous cloudy blend | homogeneous cloudy blend |
| Magnum 8391 | 24# | 65# | 11# | homogeneous cloudy blend | homogeneous cloudy blend |
| Magnum 8434 | 22# | 67# | 11# | homogeneous cloudy blend | homogeneous cloudy blend | determination by IR spectroscopy; Novodur ® is a brand name of the manufacturer Styrolution; Magnum ® is a brand name of the manufacturer Styron.

In this way, it was possible to show that styrene-based ABS copolymers having an acrylonitrile content of less than 30% by weight have particularly good solubility in solvent mixtures of 1-methoxy-2-propanol and diacetone alcohol preferred in accordance with the present invention. Thus, ABS copolymers having an acrylonitrile content in the range of ≥20% by weight to ≤30% by weight, especially in the range of ≥22% by weight to ≤25% by weight, and especially in combination with a proportion of the polybutadiene in the range of ≥10% by weight to ≤16% by weight, are particularly preferred in the context of the present invention, especially in combination with a solvent mixture of 1-methoxy-2-propanol and diacetone alcohol.

Example 3

Coating of Films

Coating compositions according to Example 1 were applied to a backing film, for example Makrofol DE 1-1 (Bayer MaterialScience AG, Leverkusen, Germany), by means of a slot coater from the manufacturer TSE Troller AG. The layer thickness of the backing film was 250 μm.

Typical application conditions here were as follows:
web speed 1.3 to 2.0 m/min
wet coating material applied 20-150 μm
air circulation dryer 90-110° C., preferably in the region of the TG of the polymer to be dried.
residence time in the dryer 3.5-5 min.

The coating was effected roll to roll, meaning that the polycarbonate film was unrolled in the coating system. The film was conducted through one of the abovementioned application units and contacted with the coating solution. Thereafter, the film with the wet coating was run through the dryer. After leaving the dryer, the now dry coating was typically provided with a lamination film, in order to protect it from soiling and scratching. Thereafter, the film was rolled up again.

For the testing of the final properties of the product, the coated film, after leaving the dryer, can first be cured with a UV lamp and then provided with a lamination film.

Example 4

Testing of Blocking Resistance

The coated sides of the non-UV-cured films produced in Example 3 were covered with a lamination film of the GH-X 173 A type (Bischof+Klein, Lengerich, Germany) and weighted down with an aluminium sheet of dimensions 4.5×4.5 cm$^2$ and a weight of 2 kg at about 23° C. for 1 h. Thereafter, the weight and the lamination film were removed and the surface of the coating was checked visually for changes.

TABLE 1

Blocking resistance of the coatings

| Coating composition | Layer thickness on 250 μm PC film | Blocking resistance |
|---|---|---|
| Example 1 | 8 μm | OK |
| Example 1 | 13 μm | OK |
| Example 1 | 18 μm | OK |
| Example 1 | 24 μm | OK |

Example 5

Forming of the Coated Films and Curing of the Coatings

The HPF forming tests were performed on an SAMK 360 system. The mould was electrically heated to 100° C. The film heating was undertaken by means of IR emitters at 240, 260 and 280° C. The heating time was 16 seconds. A film temperature of about 170° C. was attained. The forming was effected at a forming pressure of 100 bar. The forming mould was a heating/ventilation panel (HV panel).

The appropriate film sheet was fixed at an exact position on a pallet. The pallet passed through the forming station into the heating zone and resided therein for the time set (16 s). In the course of this, the film was heated in such a way that the film briefly experienced a temperature above the softening point; the core of the film was about 10-20° C. colder. As a result, the film was relatively stable when it is run into the forming station.

In the forming station, the film was fixed by closing the mould over the actual mould; at the same time, the film was formed over the mould by means of gas pressure. The pressure hold time of 7 s ensured that the film was accurately formed by the mould. After the hold time, the gas pressure was released again. The mould opened and the formed film was run out of the forming station.

The film was subsequently removed from the pallet and could then be cured with UV light.

With the mould used, radii down to 1 mm were formed.

The UV curing of the inventive coating was executed with an evo 7 dr high-pressure mercury vapour lamp (ssr engineering GmbH, Lippstadt, Germany). This system is equipped with dichroitic reflectors and quartz discs, and has a specific power of 160 W/cm. A UV dose of 2.0 J/cm$^2$ and an intensity of 1.4 W/cm$^2$ were applied. The surface temperature was to reach >60° C.

The UV dose figures were determined with a Lightbug ILT 490 (International Light Technologies Inc., Peabody Mass., USA). The surface temperature figures were determined with temperature test strips of the RS brand (catalogue number 285-936; RS Components GmbH, Bad Hersfeld, Germany).

Results for the durability of the coatings which have been crosslinked using the conditions specified can be found in Table 2.

TABLE 2

Chemical resistance and scratch resistance of the coatings

| Coating composition/Layer thickness on 250 μm PC film | Solvent IP/MPA/X/EA/Ac 1 h/RT | Pencil hardness 500 g Mitsubishi | Steel wool (manufacturer: Rakso, No. 00) 560 g/10 DH ΔG/ΔH | Haze |
|---|---|---|---|---|
| Example 1/8 μm | 0/0/0/0/0 | HB | 6/0 | 1.36 |
| Example 1/13 μm | 0/0/0/0/0 | HB | 7/18 | 2.82 |
| Example 1/18 μm | 0/0/0/0/0 | F-H | 12/24 | 4.27 |
| Example 1/24 μm | 0/0/0/0/0 | F-H | 10/5 | 7.66 |
| Makrofol DE 1-1 250 μm | 0/5/5/5/5 | 3B | 100/285 | — |

IP/MPA/X/EA/Ac stands for isopropanol, 1-methoxy-2-propyl acetate, xylene, ethyl acetate, acetone RT stands for room temperature, about 23° C. here.

Makrofol DE 1-1, 250 μm is an uncoated polycarbonate film (manufacturer: Bayer MaterialScience).

As Table 2 shows, the inventive coating, even in a thin layer, distinctly improves the pencil hardness and scratch resistance of the film compared to the known properties of the polycarbonate. The coating also imparts a high solvent resistance. Compared to extruded ABS layers, the optical cloudiness (haze) of the ABS layer can be significantly reduced by appropriately thin coating, without losing the metallizability.

Example 6

Metallization (Galvanization)

The roughening of the surface of the ABS polymer was effected in a chromosulphuric acid etchant at a working temperature of 60° C. The dipping time was 10 minutes. It is assumed that, during this operation, a constituent of the ABS, the butadiene rubber, was leached out of the surface under oxidation, and that caverns in the microscopic range were formed in this way. Thereafter, the parts were rinsed vigourously with water and with sodium hydrogensulphite solution.

Palladium nuclei were inserted into the cavities formed by the processes described in DE 10 2004 026 489 B3 as an activator, which catalysed the subsequent chemical nickel-plating in the nickel bath (nickel sulphate; ammonia and sodium hypophosphite), as described in WO 2012/120007 A1, page 19 line 30 to page 20 line 4. Thus, a first thin, conductive nickel layer was obtained, which had very good mechanical interlocking with the plastic through the filling of the cavities, and had correspondingly good adhesion.

It was then possible to deposit further metal layers on this conductive layer by electrochemical means.

Formed films produced in the HPF process having the inventive coating, UV-cured and insert-moulded with thermoplastic, show a homogeneous, conductive nickel layer after the above treatment.

As the examples clearly showed, the coated films of the invention have scratch-resistant and solvent-resistant surfaces. In addition, these surfaces have good metallizability in the standard processes. Thus, the inventive coating composition and the inventive films are of excellent suitability for production of all kinds of mouldings with metallic surfaces, especially by film insert moulding processes.

The invention claimed is:

1. A coating composition comprising
   (a) at least one thermoplastic acrylonitrile-butadiene-styrene copolymer in a content of at least 30% by weight of solids content of the coating composition;
   (b) at least one UV-curable reactive diluent in a content of at least 30% by weight of solids content of the coating composition;
   (c) at least one photoinitiator in a content of $\geq 0.1$ to $\leq 10$ parts by weight of the solids content of the coating composition; and
   (d) at least one organic solvent comprising a mixture of 1-methoxy-2-propanol and at least 50% by weight of diacetone alcohol,
   having a proportion of ethylenically unsaturated groups of at least 3 mol per kg of solids content of the coating composition,
   wherein the acrylonitrile-butadiene-styrene copolymer (a) has an acrylonitrile content in the range from $\geq 22\%$ to $\leq 25\%$, and wherein the acrylonitrile-butadiene-styrene copolymer (a) has a polybutadiene content in the range from $\geq 10\%$ to $\leq 16\%$.

2. The coating composition as claimed in claim 1, wherein the acrylonitrile-butadiene-styrene copolymer (a) has a Vicat softening temperature VET to ISO 306 of at least 95° C.

3. The coating composition as claimed in claim 1, wherein the at least one UV-curable reactive diluent (b) comprises bifunctional, trifunctional, tetrafunctional, pentafunctional and/or hexafunctional acrylic and/or methacrylic monomers.

* * * * *